June 8, 1926.  
J. WILLMANN  
1,588,287  
TEMPERATURE CONTROLLED, TEMPERATURE INDICATING, AND TIME DURATION INDICATING DEVICE  
Filed August 21, 1922 2 Sheets-Sheet 1
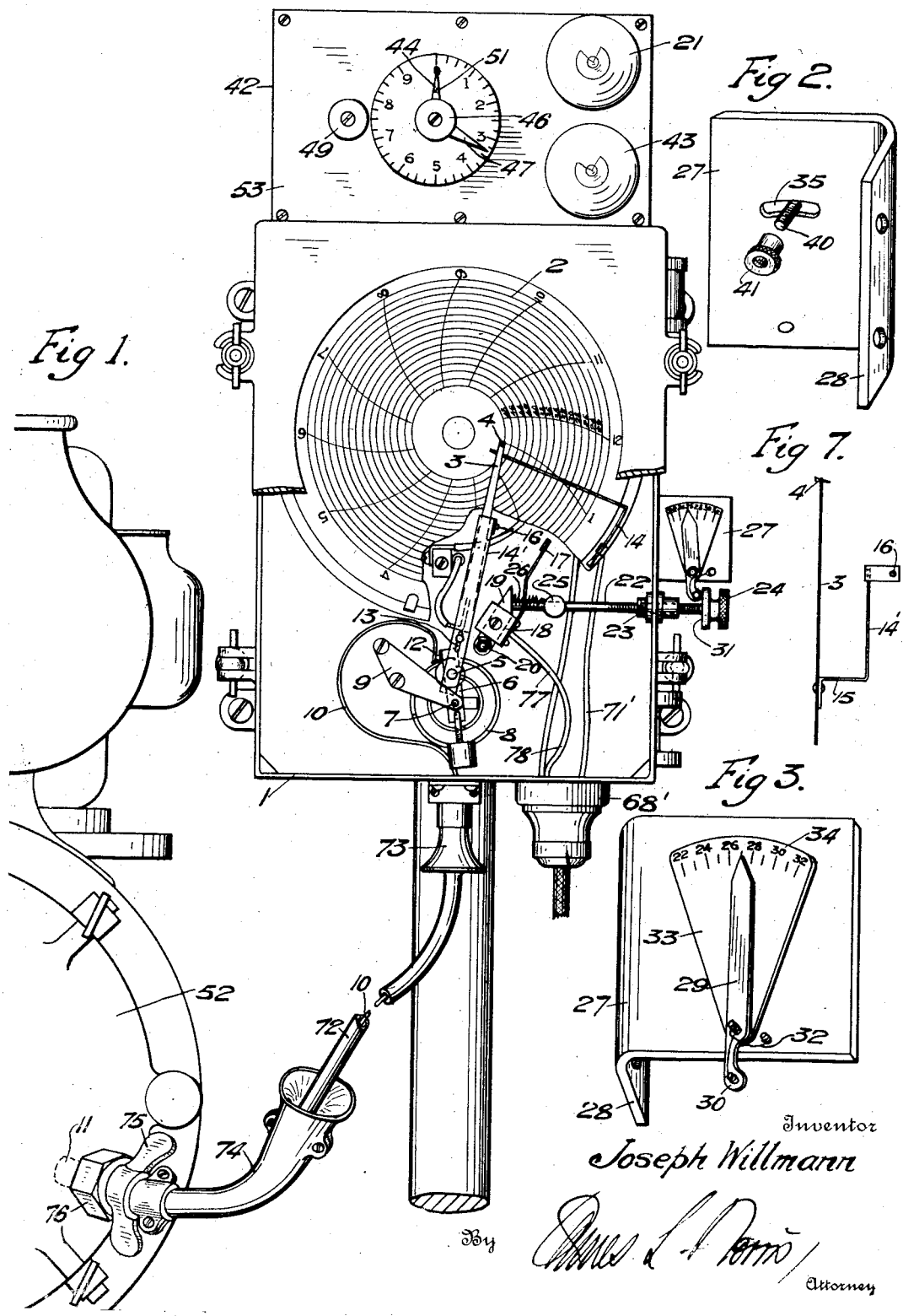
Inventor  
Joseph Willmann  
By  
Attorney June 8, 1926.　　　　　　　　　　　　　　　　　　　1,588,287
J. WILLMANN
TEMPERATURE CONTROLLED, TEMPERATURE INDICATING.
AND TIME DURATION INDICATING DEVICE
Filed August 21, 1922　　　　2 Sheets-Sheet 2
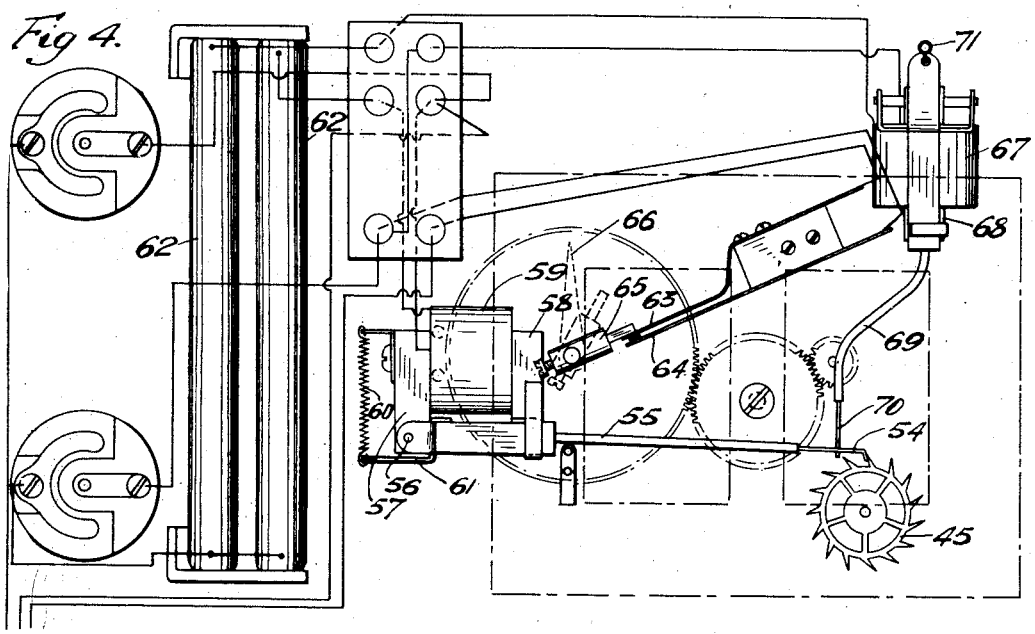
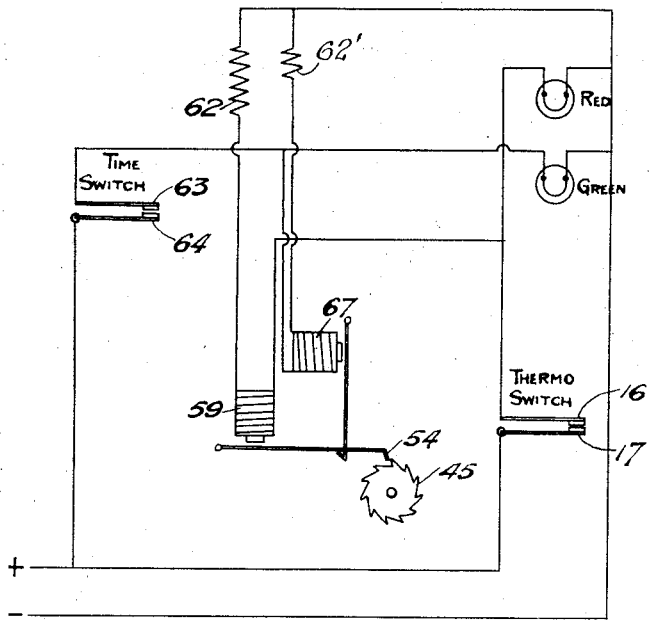
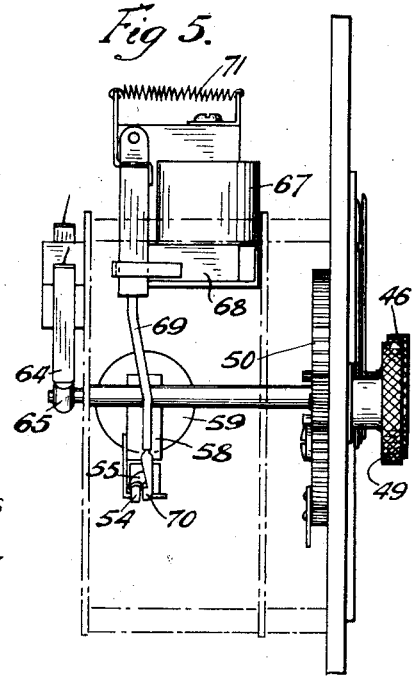
Inventor
Joseph Willmann
By
Attorney Patented June 8, 1926.

1,588,287

UNITED STATES PATENT OFFICE.

JOSEPH WILLMANN, OF DERBY, CONNECTICUT.

TEMPERATURE-CONTROLLED, TEMPERATURE-INDICATING, AND TIME-DURATION-INDICATING DEVICE.

Application filed August 21, 1922. Serial No. 583,267.

This invention relates to instrumentalities for the exact and efficient carrying out of the Willmann process for making ice cream which constitutes the subject matter of my pending application Serial No. 622,623, filed Nov. 22, 1922.

This process includes the steps of cooling the mix within a jacketed freezing can by means of brine or other cooling medium, passed through the jacket thereof, down to the temperature at which the fluidity of the mix is best suited to the incorporation of air, producing the swell in the volume of the mix which is known as the overrun; holding the mix at that temperature during the whipping of the same, and continuing the whipping just to the point, but no further, at which maximum overrun is obtained. Whipping for too long a period results in an undue rise in the temperature of the mix, a loss of some of the air and consequent shrinkage in the overrun, or solidification of the ice cream to a degree which makes difficult its ejection from the freezing can.

The temperature at which the whipping should begin depends upon several factors one of which is the sugar content of the mix, a greater proportion of sugar requiring a lower whipping temperature. The calculation of the proper whippng temperature is a matter which does not directly concern the present invention but it is vital to the most efficient carrying out of the process, both from the standpoint of quality of the product, maximum overrun, and briefness of time in the freezing of a batch, that the arrival of the mix at the critical whipping temperature be made known to the ice cream maker, and also that the duration of the proper period of whipping be accurately indicated.

One of the objects of this invention is the provision of thermo means for automatically operating a signal at that moment when the critical whipping temperature is reached, which is also the signal for the beginning of the whipping period, and simultaneously setting in motion time controlled mechanism for actuating a signal to indicate the time of termination of the whipping period.

Another object of the invention is the provision of means for setting the time control mechanism to indicate a whipping period of predetermined duration.

Still another object of the invention is the construction of a casing in which is enclosed a thermally controlled temperature registering and time duration indicating device, with means arranged exteriorly of the casing for the selective setting of the thermally controlled mechanism to operate at a predetermined temperature.

A further object of the invention is the provision of an adjustable scale associated with the outside setting means for the purpose of compensating for inaccuracy in the thermally controlled mechanism.

While the preferred embodiment of my thermally controlled temperature registering and indicating and time duration indicating device herein described relates to the combination of the same with an ice cream freezer it is obvious that it is equally applicable to the holding step in the process of pasteurizing or sterilizing or any process in which attainment of a definite initial temperature is a condition precedent to the beginning of a time period during which an act or step in said process is continued.

With the above and other objects in view, my invention consists in the improved temperature controlled, temperature indicating and time duration indicating device illustrated in the accompanying drawings, described in the following specification, and particularly claimed, and in such variations and modifications thereof as will be obvious to those skilled in the art to which my invention relates.

In the drawings accompanying and forming a part of this specification, and wherein the preferred embodiment of my invention is illustrated:—

Figure 1 is a front elevation of the thermally controlled temperature registering and indicating and time duration indicating device, parts being removed to show underlying parts.

Figures 2 and 3 are detail views in perspective of the outside setting means.

Figure 4 is a rear elevation, somewhat diagrammatic in character of the time duration indicating mechanism, parts being omitted.

Figure 5 is an end view of the mechanism shown in Figure 4, with certain parts being removed.

Figure 6 is a diagram of the electric circuits through which the several features of the device are operated.

Figure 7 is a detail view of the registering hand and contact carrying arm attached thereto taken in a plane at right angles to that shown in Figure 1.

Referring now in detail to the several figures the numeral 1 represents a casing in which is enclosed a registering mechanism comprising a chart 2 which is rotated by clockwork not shown, but also enclosed in the casing. The chart is inscribed radially dividing it into hour intervals and concentrically into temperature degree intervals. The hand 3 moves over the face of the chart in a radial arc and carries at its outer end a pen 4 which leaves a recording mark upon the face of the chart. The hand 3 is pivotally connected at 5 to a weighted arm 6 rigidly carried upon a shaft 7 the latter being attached to the inner end of a Bourdon coil 8 and journalled in a bearing carried by the rigid bracket 9. The other end of the Bourdon coil is connected by a tube 10 of small bore with the bulb 11 of a thermometer, said bulb and tube being filled with a suitable expansive fluid. The Bourdon coil is actuated by temperature changes to which the bulb 11 is exposed, said bulb being inserted through the wall of the freezing can 52 into direct contact with the mix. Its initial movement is not communicated to the hand 3 because of the pivotal connection 5 between said arm and hand. When, however, the hand and arm assume a rectilinear relation, then an upstanding edge 12 on one side of the arm 6 co-acts with the hand 3 so that the two bodies thenceforth move unitarily together. The hand 3 is adjustable for length by means of the slotted connection 13 and a lifter 14 is arranged beneath the end of the hand adjacent the pin for raising the latter from the chart when it is desired that the registering means be rendered inoperative. The detailed construction of the hand as herein described is not a part of the present invention. Beneath the hand 3 is an arm 14' which is attached to said hand by the angular member 15 and lying parallel therewith. The arm 14' carries at its outer end an electrical contact 16 which is adapted after a certain travel of the hand 3 to engage an electric contact 17. The latter is attached to an insulation block 18 secured to a swinging arm 19 pivotally mounted on the top of the rigid post 20. From an inspection of the diagram shown in Figure 6 it will be observed that when the circuit is closed through the contacts 16 and 17 current flows through a red lamp which is represented by the numeral 21 in Figure 1. A circuit through a solenoid is also closed by the engagement of said contacts, which circuit will be described in due course.

The contacts 16 and 17 are arranged to be closed at any desired predetermined temperature, to which end the swinging contact 17 is constructed to be moved closer or farther away from the contact 16 by means manipulable from outside the casing 1. These means consist of a threaded rod 22 which passes through a threaded bushing 23 in the side of the casing and carrying at its outer end a thumb nut 24 by which it is turned. The inner end of the rod 22 is unthreaded and passes slidably through an aperture in a supporting post 25. The swinging arm 19 bears against the end of the rod 22 with a resilient pressure imparted by the spiral spring 26 which is attached at one end to said arm and at the other to the post. The threaded engagement of the rod 22 with the bushing 23 affords a micrometer adjustment of the angular position of the contact 17.

Mounted adjacent the projecting end of the rod 22 is a bracket 27 having a downwardly turned flange 28 riveted or otherwise fastened to the side of the casing 1. A hand 29 is pivotally mounted on said bracket and has a projecting lower end 30 which bears against the inner face of a shoulder 31 formed on the thumb nut 24. A light spring 32 is secured to posts located respectively on said hand and said bracket and holds the hand 29 lightly pressed against the shoulder 31. A plate 33 lies beneath the hand 29 and carries arcuately at its outer edge a scale 34 which is readable in connection with the pointed end of the hand 29. The scale is inscribed with temperature degree intervals corresponding to the temperature degree intervals upon the chart 2 and so arranged that the temperature indication upon the scale 34 when the contacts 16 and 17 are together will be the same as that upon the chart for a given position of the hand 29.

It sometimes happens that through lost motion due to wear or for other causes the temperature readings upon the chart 2 and scale 34 when the contacts 16 and 17 are in engagement do not agree. In order to compensate for any inaccuracy thus arising, the plate 33 is made adjustably movable with respect to the bracket 27. This is accomplished by having the plate 33 pivotally mounted upon the same axis as the hand 29 and providing an arcuate slot 35 through the bracket 27 beneath the plate 33. A threaded pin 40 is secured to the underside of the plate 33, projecting through said slot 35 and a threaded thumb nut 41 cooperates with said pin to clampably hold the plate 33 in adjusted position with respect to the bracket.

A casing 42 is arranged above the casing 1 and is provided with a cover plate 53 on the outer face of which is located a pair of lamp sockets carrying lamps 21 and 43 the former being red and the latter green. A minute dial also is carried on the front of the casing 42 over which rotates the minute hand 44 frictionally attached to the shaft of a clock mechanism within said casing and represented, in Figure 4 by the escapement wheel 45. The minute hand 44 is set by turning the knob 46 which is fixed to said minute hand. A stop to determine the limit of setting of said minute hand is provided in the form of a hand 47 rotatable about the axis of the minute hand and actuated by means of the knob 49 through a train of gearing 50 shown in Figure 5 and located on the back of the cover plate of the casing 42. The hand 44 has a small lug 51 projecting downwardly in the path of the hand 47 so that when the minute hand is turned to the right it cannot be moved farther than the limit imposed by contact of the lug 51 with the hand 47.

The clockwork within the casing 42 is controlled through the escapement wheel 45 by means of a pawl 54 attached to the lever 55, the latter being pivoted at 56 to a stationary support 57 and operated by means of an armature 58 of the solenoid 59. The pawl 54 is normally kept in engagement with the teeth of the escapement wheel 45 as shown in Figure 4, to inhibit the movement of said escapement wheel, by means of the spiral spring 60 which is secured at one end to the support 57 and at its other end to a bent rod 61, and exerts a downward tension upon the lever 55.

Referring now to Figure 6 it will be seen that when the circuit is closed through the contacts 16 and 17 not only will the red lamp be illuminated but a circuit will at the same time be closed through the solenoid 59 and the resistance 62 energizing said solenoid and pulling the pawl 54 away from engagement with the escapement wheel 45 permitting the clockworks to operate. In other words when the critical temperature has been reached in the freezing can, the red light is illuminated and at the same time the clockworks are set in motion to begin the period of duration of the whipping process. When the ice cream maker observes the lighting of the red lamp he at once shuts off the brine, holding the mix at the critical whipping temperature and permits the whipping process to continue until the termination of the predetermined whipping period is indicated to him by the lighting of the green lamp.

This is accomplished by means of the closing of a pair of contacts 63 and 64 which are carried by the frame of the clockwork mechanism and brought together by the engagement with one of said contacts of an operating member 65 secured to the shaft of the minute hand 44 so as to be rotatable therewith. The contacts 63 and 64 are normally open but when the minute hand reaches the zero position shown in dotted lines at 66 in Figure 4 the operating member 65 engages the contact 63 and closes said contacts 63 and 64. This closes a circuit which energizes the solenoid 67, said circuit being in parallel with the circuit of the solenoid 59 and having a resistance 62' of less value than that of the resistance 62, so that closing of the circuit through the contacts 63 and 64 deenergizes the solenoid 59. The armature 68 of the solenoid 67 controls the movement of a lever 69 to the end of which is secured a latch 70. A spring 71 similar in all respects to the spring 60 associated with the solenoid 59 normally holds the latch 70 beneath the pawl 54 when the latter is raised thus retaining said pawl out of engagement with the escapement wheel 45 throughout the duration of the whipping period regardless of whether the temperature of the mix may have risen in the meantime so as to open the contacts 16 and 17 and de-energize the solenoid 59. At the termination of the whipping period, that is when the minute hand 66 reaches the zero position and the contacts 63 and 64 are closed by pressure of the operating member 65, a circuit is closed through the solenoid 67 which causes the armature 68 thereof to pull the lever 69 and the latch 70 away from the pawl 54 permitting the fall of the latter into engagement with the teeth of the escapement wheel and stopping the clockwork mechanism. The duration of time between the rising of the pawl 54 upon closing of the circuit through contacts 16 and 17 and the dropping of said pawl due to closure of the circuit through the contacts 63 and 64 is determined by the angular distance at which the operating member 65 is initially set away from the contact 63 by setting the minute hand 44. The minute hand is always set a certain number of minutes away from the zero position and the duration of the time period between the starting and stopping of the clockwork lasts until the minute hand reaches zero, at which instant the green lamp is illuminated. The circuit which is completed when the contacts 63 and 64 are drawn together may be traced in Figure 6 through the green light and also through the solenoid 67. It is immaterial whether or not the thermo switch represented by the contacts 16 and 17 remains closed during the entire whipping period, for the interposition of the resistances 62 62' in the solenoid circuits insures the de-energization of the solenoid 59 at the moment of completion of the circuit through the solenoid 67.

It will be observed from Figure 1 that the casing 1 is provided with an electric socket 68' for attachment to the ordinary 110 volt lighting circuit, one of the poles of said socket being connected by branched wires 77 and 78 respectively to the thermal and time switches, the other pole being connected directly by the wire 71' to the lamps.

The tube 10 which connects the bulb 11 to the thermometer to the Bourdon coil is protected outside of the casing 1 by a flexible metallic sheath 72 which is surrounded at its upper and lower ends by flaring guards 73 and 74 which are provided to prevent abrupt bending of the tube 10 and sheath 72. The bulb 11 is secured in the freezer can by the quick detachable nut 75 which engages the bushing 76 fixed to the wall of the freezing can.

Having described my invention what I claim as new and desire to secure by Letters Patent, is:—

1. A temperature controlled time duration indicator including a thermal switch and a time switch, a circuit closed by said thermal switch, a signal in said circuit operable upon closure of its circuit, means actuated upon closure of the thermal switch to start in operation said time switch, a circuit closed by said time switch after a predetermined period of operation of said time switch, and means in said circuit operable upon closure thereof to render said time switch inoperative.

2. A temperature controlled time duration indicator comprising a thermal switch and a time switch, circuits closed thereby, a signal in each circuit operable upon closure of said circuit, means operated by closure of the thermal switch to start in operation said time switch, means actuated by said time switch after a predetermined period of operation to stop the movement of said time switch and means for adjustably setting said time switch to vary the period of operation thereof.

3. A temperature controlled time duration indicator comprising a thermal switch and a rotary time switch, circuits closed thereby, a signal in each circuit operable upon closure of its circuit, means actuated upon closure of the thermal switch to start in operation said rotary time switch, means actuated by said time switch after a predetermined period of operation thereof, to stop the movement of said time switch, means for adjustably setting said time switch to vary the period of operation thereof and means to limit the adjustment of said time switch comprising an element rotatable axially of said time switch and lying in the path thereof for engagement therewith.

4. A temperature controlled time duration indicator comprising a thermal switch and a time switch, circuits closed thereby, a signal in each circuit operable upon closure of its circuit, a clockwork for operating said time switch, an escapement wheel for said clockwork, a pawl lying normally in engagement with said escapement wheel to inhibit the movement thereof, a solenoid operable when the thermal switch is closed to raise said pawl from engagement with said escapement wheel, a second solenoid, means controlled by said second solenoid for normally holding said pawl away from said escapement wheel after it has been lifted therefrom by the first solenoid, said second solenoid being energized upon closure of said time switch for releasing said pawl after a predetermined period of operation of said time switch.

5. A temperature controlled time duration indicator, comprising a casing, a thermal switch and a rotatable time switch within said casing, circuits closed thereby, a signal in each circuit mounted on said casing and operable upon closure of its circuit, a time indicating dial on said casing, an indicating hand cooperable with said dial and rotatable with said time switch, means for setting said hand and simultaneously angularly moving an element of said time switch, means for limiting the setting movement of said hand and comprising a second hand mounted axially of said first hand and affording a stop for the latter and manual means operable through a train of gears for setting said limiting means.

6. A temperature controlled, temperature registering, indicating and time duration indicating device, for carrying out an ice cream making process comprising a thermostat having a thermosensitive bulb insertable into a freezing can of an ice cream freezer and a thermostatic element connected to said can, flexible means connecting said bulb and thermostatic element, a registering hand actuated by said thermostatic element, an electrical contact carried by said hand, a second contact operably arranged with respect to said first contact and angularly adjustable with respect thereto, a signal in circuit with said first and second contacts, a time switch, a clockwork for operating said time switch, means operable upon closure of said first and second contacts for actuating an element to start said clockwork thereby starting the operation of said time switch and means for holding said starting element away from said clockwork during the period of operation of said time switch, said holding means being operable upon closure of said inner switch to release said starting means permitting it to stop said clockwork, and a signal operable upon closure of said time switch.

In testimony whereof I have hereunto set my hand.

JOSEPH WILLMANN.